(12) United States Patent  
Belhe et al.

(10) Patent No.: US 8,571,900 B2
(45) Date of Patent: *Oct. 29, 2013

(54) SYSTEM AND METHOD FOR PROCESSING DATA RELATING TO INSURANCE CLAIM STABILITY INDICATOR

(71) Applicant: Hartford Fire Insurance Company, Hartford, CT (US)

(72) Inventors: Upendra D. Belhe, Avon, CT (US); Gregory P. Goddu, Bolton, CT (US); Kelly J. McLaughlin, Cobalt, CT (US); Kathleen F. Mauer, Westbrook, CT (US); Natalie Mohanty, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/715,426

(22) Filed: Dec. 14, 2012

(65) Prior Publication Data
US 2013/0144659 A1 Jun. 6, 2013

Related U.S. Application Data

(63) Continuation of application No. 12/004,390, filed on Dec. 19, 2007, now Pat. No. 8,359,209.

(60) Provisional application No. 60/875,750, filed on Dec. 19, 2006.

(51) Int. Cl.
*G06Q 40/00* (2012.01)

(52) U.S. Cl.
USPC .............................................. 705/4; 705/35

(58) Field of Classification Search
USPC ........................................................ 705/4, 2
See application file for complete search history.

(56) References Cited

U.S. PATENT DOCUMENTS

| | | | |
|---|---|---|---|
| 5,613,072 A | 3/1997 | Hammond et al. |
| 5,664,109 A | 9/1997 | Johnson et al. |
| 5,712,984 A | 1/1998 | Hammond et al. |
| 5,796,932 A | 8/1998 | Fox et al. |
| 5,819,226 A | 10/1998 | Gopinathan et al. |
| 5,926,800 A | 7/1999 | Baronowski et al. |
| 5,950,150 A | 9/1999 | Lloyd et al. |
| 5,970,464 A | 10/1999 | Apte et al. |

(Continued)

FOREIGN PATENT DOCUMENTS

WO 01/13295 A1 2/2001

OTHER PUBLICATIONS

Werner et al. GLM Basic Modeling: Avoiding Common Pitfalls. Casualty Actuarial Society Forum. pp. 257-272. (Winter 2007).

(Continued)

*Primary Examiner* — Ojo O Oyebisi
(74) *Attorney, Agent, or Firm* — Howard IP Law Group, PC

(57) ABSTRACT

The invention relates generally to data analysis, and to systems and methods for the computation of the volatility of a loss. The system comprises a module for receiving a data parameter, a database for storing the parameter, a computerized predictive model, and a business logic processor for executing the predictive model. The volatility is used to, among other things, determine an appropriate work flow for handling the loss.

20 Claims, 11 Drawing Sheets

(56) References Cited

U.S. PATENT DOCUMENTS

| | | | |
|---|---|---|---|
| 6,014,632 A | 1/2000 | Gamble et al. | |
| 6,067,488 A | 5/2000 | Tano | |
| 6,078,857 A | 6/2000 | Jung et al. | |
| 6,112,225 A | 8/2000 | Kraft et al. | |
| 6,154,658 A | 11/2000 | Caci | |
| 6,163,770 A | 12/2000 | Gamble et al. | |
| 6,204,757 B1 | 3/2001 | Evans et al. | |
| 6,246,934 B1 | 6/2001 | Otake et al. | |
| 6,438,547 B1 | 8/2002 | Mehr et al. | |
| 6,594,579 B1 | 7/2003 | Lowrey et al. | |
| 6,611,740 B2 | 8/2003 | Lowrey et al. | |
| 6,643,578 B2 | 11/2003 | Levine | |
| 6,710,738 B2 | 3/2004 | Allen, Jr. | |
| 6,756,915 B2 | 6/2004 | Choi | |
| 6,768,417 B2 | 7/2004 | Kuragaki et al. | |
| 6,832,141 B2 | 12/2004 | Skeen et al. | |
| 6,839,305 B2 | 1/2005 | Perlman et al. | |
| 6,853,956 B2 | 2/2005 | Ballard, Jr. et al. | |
| 6,917,952 B1 | 7/2005 | Dailey et al. | |
| 6,920,379 B2 | 7/2005 | Miyamoto | |
| 6,925,425 B2 | 8/2005 | Remboski et al. | |
| 6,957,133 B1 | 10/2005 | Hunt et al. | |
| 6,959,296 B1 | 10/2005 | Reiss | |
| 6,965,326 B2 | 11/2005 | Allison | |
| 6,973,319 B2 | 12/2005 | Ormson | |
| 6,977,612 B1 | 12/2005 | Bennett | |
| 6,985,922 B1 | 1/2006 | Bashen et al. | |
| 7,007,245 B2 | 2/2006 | D'Souza et al. | |
| 7,039,592 B1 | 5/2006 | Yegge et al. | |
| 7,039,654 B1 | 5/2006 | Eder | |
| 7,072,841 B1 | 7/2006 | Pednault | |
| 7,215,255 B2 | 5/2007 | Grush | |
| 7,392,201 B1* | 6/2008 | Binns et al. | 705/4 |
| 7,542,913 B1 | 6/2009 | Meek et al. | |
| 7,702,615 B1 | 4/2010 | Delurgio et al. | |
| 7,840,397 B2 | 11/2010 | Chiou | |
| 2001/0020229 A1 | 9/2001 | Lash | |
| 2002/0010598 A1 | 1/2002 | Johnson et al. | |
| 2002/0072958 A1 | 6/2002 | Yuyama et al. | |
| 2002/0099596 A1 | 7/2002 | Geraghty | |
| 2002/0147617 A1 | 10/2002 | Schoenbaum et al. | |
| 2002/0161609 A1 | 10/2002 | Zizzamia et al. | |
| 2002/0173885 A1 | 11/2002 | Lowrey et al. | |
| 2002/0194113 A1 | 12/2002 | Lof et al. | |
| 2002/0198801 A1 | 12/2002 | Dixon et al. | |
| 2003/0028406 A1 | 2/2003 | Herz et al. | |
| 2003/0061075 A1 | 3/2003 | Heckman et al. | |
| 2003/0097330 A1 | 5/2003 | Hillmer et al. | |
| 2003/0101080 A1 | 5/2003 | Zizzamia et al. | |
| 2003/0105651 A1 | 6/2003 | Gendelman | |
| 2003/0167191 A1 | 9/2003 | Slabonik et al. | |
| 2003/0171956 A1 | 9/2003 | Cox et al. | |
| 2004/0103002 A1 | 5/2004 | Colley et al. | |
| 2004/0128147 A1 | 7/2004 | Vallinayagam et al. | |
| 2004/0133439 A1 | 7/2004 | Noetzold et al. | |
| 2004/0138927 A1 | 7/2004 | Eydeland et al. | |
| 2004/0153362 A1 | 8/2004 | Bauer et al. | |
| 2004/0186753 A1 | 9/2004 | Kim et al. | |
| 2004/0199410 A1 | 10/2004 | Feyen et al. | |
| 2004/0220784 A1 | 11/2004 | Stephenson et al. | |
| 2004/0220837 A1 | 11/2004 | Bonissone et al. | |
| 2004/0220838 A1 | 11/2004 | Bonissone et al. | |
| 2004/0220839 A1 | 11/2004 | Bonissone et al. | |
| 2004/0220840 A1 | 11/2004 | Bonissone et al. | |
| 2004/0230459 A1 | 11/2004 | Dordick et al. | |
| 2004/0236611 A1 | 11/2004 | Bonissone et al. | |
| 2004/0236676 A1 | 11/2004 | Takezawa et al. | |
| 2004/0249557 A1 | 12/2004 | Harrington et al. | |
| 2004/0249679 A1 | 12/2004 | Henderson et al. | |
| 2005/0055248 A1 | 3/2005 | Helitzer et al. | |
| 2005/0055249 A1 | 3/2005 | Helitzer et al. | |
| 2005/0060141 A1 | 3/2005 | Suzuki et al. | |
| 2005/0060207 A1 | 3/2005 | Weidner et al. | |
| 2005/0070299 A1 | 3/2005 | Caspi et al. | |
| 2005/0091080 A1 | 4/2005 | Biats, Jr. | |
| 2005/0091085 A1 | 4/2005 | Colley et al. | |
| 2005/0108063 A1 | 5/2005 | Madill, Jr. et al. | |
| 2005/0108066 A1 | 5/2005 | Weidner et al. | |
| 2005/0125213 A1 | 6/2005 | Chen et al. | |
| 2005/0125259 A1 | 6/2005 | Annappindi | |
| 2005/0131742 A1 | 6/2005 | Hoffman et al. | |
| 2005/0137912 A1 | 6/2005 | Rao et al. | |
| 2005/0171885 A1 | 8/2005 | Christman et al. | |
| 2005/0192850 A1 | 9/2005 | Lorenz | |
| 2005/0203828 A1 | 9/2005 | Lyakovetsky | |
| 2005/0222867 A1 | 10/2005 | Underwood et al. | |
| 2005/0228692 A1 | 10/2005 | Hodgdon | |
| 2005/0234742 A1 | 10/2005 | Hodgdon | |
| 2005/0240451 A1 | 10/2005 | Johnson et al. | |
| 2005/0262039 A1 | 11/2005 | Kreulen et al. | |
| 2005/0276401 A1 | 12/2005 | Madill, Jr. et al. | |
| 2006/0009289 A1 | 1/2006 | McCarten et al. | |
| 2006/0015253 A1 | 1/2006 | Ochs et al. | |
| 2006/0015360 A1 | 1/2006 | Ochs et al. | |
| 2006/0015373 A1 | 1/2006 | Cuypers | |
| 2006/0015374 A1 | 1/2006 | Ochs et al. | |
| 2006/0053038 A1 | 3/2006 | Warren et al. | |
| 2006/0064332 A1 | 3/2006 | Schoenbaum et al. | |
| 2006/0136273 A1 | 6/2006 | Zizzamia et al. | |
| 2006/0187889 A1 | 8/2006 | Mehta et al. | |
| 2006/0242046 A1 | 10/2006 | Haggerty et al. | |
| 2006/0259333 A1 | 11/2006 | Pyburn et al. | |
| 2006/0287892 A1 | 12/2006 | Jones et al. | |
| 2007/0016500 A1 | 1/2007 | Chatterji et al. | |
| 2007/0016508 A1 | 1/2007 | Lapointe et al. | |
| 2007/0016542 A1 | 1/2007 | Rosauer et al. | |
| 2007/0021987 A1 | 1/2007 | Binns et al. | |
| 2007/0027725 A1 | 2/2007 | Dirnberger et al. | |
| 2007/0027726 A1 | 2/2007 | Warren et al. | |
| 2007/0043656 A1 | 2/2007 | Lancaster | |
| 2007/0043662 A1 | 2/2007 | Lancaster | |
| 2007/0100669 A1* | 5/2007 | Wargin et al. | 705/4 |
| 2007/0106539 A1 | 5/2007 | Gay | |
| 2007/0118399 A1 | 5/2007 | Avinash et al. | |
| 2008/0040676 A1 | 2/2008 | Garg et al. | |
| 2008/0126138 A1 | 5/2008 | Cherney et al. | |
| 2008/0236177 A1 | 10/2008 | Senba et al. | |

OTHER PUBLICATIONS

Wolak, Dan. An Actuarial Response to the Health-Care Crisis, Health Section News, Society of Actuaries. Issue 47, 1-9. (Apr. 2004).

Woodfield, Terry J. Paper 071-30. Predicting Workers' Compensation Insurance Fraud Using SAS Enterprise Miner 5.1 and SAS Text Miner. SUGI 30, Data Mining and Predictive Modeling. 2004. 6 pages.

Woodfield, Terry J. Paper 13-26. Predictive Modeling in the Insurance Industry Using SAS Software. (2001). 5 pages.

Woodley et al. Assessing Predictive Modeling Tools for Pricing and Underwriting. Health Watch. Issue 51, pp. 30-33. (Jan. 2006).

Wu, et al. "Does Credit Score Really Explain Insurance Losses? Multivariate Analysis from a Data Mining Point of View." Casualty Actuarial Society Forum, pp. 113-138. 2003.

Wu, Cheng-sheng Peter et al. A View Inside the "Black Box:" A Review and Analysis of Personal Lines Insurance Credit Scoring Models Filed in the State of Virginia. Casualty Actuarial Society Forum, pp. 251-290 (Winter 2004).

Yan, et al. "Designing a Neural Network Decision System for Automated Insurance Underwriting," Int'l Joint Conference on Neural Networks, pp. 2106-2113 (Jul. 2006).

Young, Virginia R. Robust Bayesian Credibility Using Semiparametric Models. Astin Bulletin, vol. 28, No. 1, 1998, pp. 197-203.

Zadeh, L.A., Fuzzy Sets, Information and Control, vol. 8, 1965, p. 338-353.

Bardis, et al. Considerations Regarding Standards of Materiality in Estimates of Outstanding Liabilities. Casualty Actuarial Society Forum. pp. 1-65. Fall 2006.

Antonio et al. North American Actuarial Journal. 10:1, 30-48. Lognormal Mixed Models for Reported Claims Reserves. (Jan. 2006).

Apte et al. A probabilistic estimation framework for predictive modeling analytics. IBM Systems Journal. 41:3, 438-48. (2002).

(56) References Cited

OTHER PUBLICATIONS

Apte et al. Data-intensive analytics for predictive modeling. IBM Journal of Research and Development. 47:1, 17-23 (Jan. 2003).
Axelrod et al. Predictive Modeling in Health Plans. Abstract from Disease Management & Health Outcomes, 11:779-87 (9). (Nov. 2003).
Bolstad, W. M. Introduction to Bayesian Statistics. A. John Wiley & Sons. 2nd ed. 2007. 462 pages.
CAS Data Management and Information Educational Materials Working Party. Survey of Data Management and Data Quality Texts. Casualty Actuarial Society Forum, pp. 273-306. (Winter 2007).
Conger et al. Emphasis 2006. Predictive Modeling in Workers Compensation. pp. 18-21. 2006.
D'Arcy, Stephen P. Predictive Modeling in Automobile Insurance: A Preliminary Analysis. Paper presented at World Risk and Insurance Economics Congress. Aug. 2005. 33 pages.
de Alba, Enrique. Bayesian Estimation of Outstanding Claims Reserves. No. Ameri. Actuarial J. 6:4, 1-20. (2002).
de Ville, Barry. Decision Trees for Business Intelligence and Data Mining Using SAS Enterprise Miner. SAS Press Series. 2006. 241 pages.
Deloitte & Touche. Advanced analytics and the art of underwriting: Transforming the insurance industry. At least as early as Sep. 3, 2003. 12 pages.
Deloitte & Touche. Presentation Predictive Modeling for Claims: The New Claim Frontier (2006). 30 pages.
Derrig, R. et al. Comparison of Methods and Software for Modeling Nonlinear Dependencies: A Fraud Application. (2006). 25 pages.
Derrig, R. et al. Distinguishing the Forest from the Trees: A Comparison of Tree Based Data Mining Methods. Casualty Actuarial Society Forum. pp. 1-49 (Winter 2006).
Sullivan et al. DM Review. Text Mining Improves Business Intelligence and Predictive Modeling in Insurance. (Jul. 2003). 5 pages.
Ellis et al. Applying Diagnosis-Based Predictive Models to Group Underwriting. Society of Actuaries, Issue 46, 1-7. (Aug. 2003).
Fellingham et al. Comparing Credibility Estimates of Health Insurance Claims Costs. No. Ameri. Actuarial J. 9:1, 1-12. (2005).
Fetterolf, Don. Paradise Lost: Return on Investment in Disease Management. Health Watch. Issue 52, pp. 14-17. (May 2006).
Francis Analytics and Actuarial Data Mining. Predictive Modeling Workshop presentation: Training for development and deployment. At least as early as Sep. 3, 2003.13 pages.
Grimes, Seth. The Word on Text Mining. Presentation. Portals, Collaboration, and Content Management. (Apr. 14, 2005). 32 pages.
Guszcza et al. Predictive Modeling for Property-Casualty Insurance. Presentation to SoCal Actuarial Club. (Sep. 22, 2004). 40 pages.
Guven, Serhat. Predictive Modeling. Future Fellows. (Jun. 2006). 3 pages.
Hong, S.J. et al. IBM Research Report RC-21570. Advances in Predictive Model Generation for Data Mining. (1999). 18 pages.
Macleod et al. Paper. Entropy-Reducing Properties of Predictive Financial Models. Aug. 27, 1992. Actuarial Research Clearing House. vol. 3 (1993). pp. 205-229.
Magnify Press Release. Magnify Applies Predictive Modeling to Worker's Comp Underwriting and Fraud Detection. Chicago, IL (Mar. 1, 2005). 2 pages.
Magnify Press Release. Erie Insurance Reduces Fraud Losses with FraudFocus- Predictive Modeling Demonstrates Effectiveness for Auto, Property and Worker's Comp. (Feb. 4, 2005). 2 pages.
Meyers, Glenn. On Predictive Modeling for Claim Severity. Casualty Actuarial Society Forum. pp. 215-253. (Spring 2005).
Monsour, Christopher. Presentation: Discrete Predictive Modeling. Casualty Actuarial Society. Special Interest Seminar on Predictive Modeling. (Oct. 5, 2004) 81 pages.
Monsour, Christopher. Presentation: What is Predictive Modeling? (2005) 79 pages.
Morgan et al. Conjugate Bayesian Analysis of the Negative Binomial Distribution. Actuarial Research Clearing House. vol. 1, pp. 97-118, (1993).
Mosley, R. The Use of Predictive Modeling in the Insurance Industry. Pinnacle Actuarial Resources Inc. (Jan. 2005) 4 pages.
Muller, Stacey. Predictive Modeling: Using Claims Data to Find Trends and Cost Drivers. Milliman Consultant's Corner. At least as early as Sep. 4, 2003. 3 pages.
Pednault et al. IBM Research Report RC-21731. Handling Imbalanced Data Sets in Insurance Risk Modeling. (Mar. 10, 2000). 6 pages.
Pednault et al. IBM Research Report RC-21757. The Importance of Estimation Errors in Cost-Sensitive Learning. (May 30, 2000) 7 pages.
Weyuker, L. et al. Predictive Modeling Applications., Record, 31:2. New Orleans Health/Pension Spring Meeting, Session 3PD. (Jun. 2005). 17 pages.
Predictive Modeling Raises Opportunities and Issues for Actuaries and Insurers, CAS Annual Meeting is Told. Insurance Newscast (Dec. 15, 2005) 2 pages.
Predictive Modeling. Record, 28:2. Spring Meeting, San Francisco, CA. Session 990F. (Jun. 2002) 20 pages.
Predictive Modeling-Current Practices and Future Applications. Record, 30:1. Spring Meeting, Anaheim, CA. Session 64PD. (May 2004) 20 pages.
Roberts, Jack. Risk & Insurance. Fighting CAT risk creep. 18:8, p. 26(2). (2007).
Rosella Data Mining & Database Analytics. Downloaded from www.roselladb.com/insurance-risk-analysis.htm. At least as early as Sep. 3, 2003. 6 pages.
Rosella Data Mining & Predictive Analytics. Predicting Modeling Software. Downloaded from www.roselladb.com/predictive-modeling.htm. At least as early as Sep. 3, 2003. 5 pages.
Rosenberg et al. Predictive Modeling with Longitudinal Data: A Case Study of Wisconsin Nursing Homes. School of Business, University of Wisconsin (Feb. 4, 2006). pp. 1-122.
Roudebush et al. Converting Clinical Literature to an Insured Population: A Comparison of Models Using NHANES. No. Ameri. Actuarial J. 6:4, 55-66. (2002).
Sanche et al. Variable Reduction for Predictive Modeling with Clustering. Casualty Actuarial Society Forum, pp. 89-100. (Winter 2006).
Sharp, Keith P. Aspects of Interest Rate Models. Actuarial Research Clearing House. vol. 1, pp. 433-57. (Aug. 25, 1990).
Steed, Judy. Winning Ways. Toronto Star, p. 3-4 (May 21, 2007).
Stehno, Chris E. What We Have Learned in the Last 50 Years-and Aren't Using. Health Watch. Issue 52, pp. 18-21. (May 2006).
Table of Contents of White Paper. Predictive Modeling in Insurance: An insurance industry executive briefing. SAS (Predictive Modeling in Insurance), publisher. (Mar. 23, 2007). 2 pages.
Tkach, Daniel S. Information Mining with the IBM Intelligent Miner Family. (An IBM Software Solutions White Paper) (Feb. 1998) 29 pages.
Wang, Wei. Thesis. Predictive Modeling Based on Classification and Pattern Matching Methods. (May 1999). 134 pages.

\* cited by examiner

SYSTEM AND METHOD FOR PROCESSING DATA RELATING TO INSURANCE CLAIM STABILITY INDICATOR

CROSS-REFERENCE TO RELATED APPLICATIONS

This application is a continuation of U.S. patent application Ser. No. 12/004,390, entitled SYSTEM AND METHOD FOR PREDICTING AND RESPONDING TO A LIKELIHOOD OF VOLATILITY, filed Dec. 19, 2007, which application claims the benefit of U.S. Provisional Application Ser. No. 60/875,750, filed Dec. 19, 2006, the entire contents of which are incorporated herein by reference for all purposes.

FIELD OF THE INVENTION

The invention relates generally to data analysis, and to a system and method for the computation of the volatility of losses.

BACKGROUND OF THE INVENTION

The cost of resolving many insurance claims is predictable with a great deal of certainty. For other claims, the confidence an insurer can have in predicting the total cost of resolving a claim may be much lower. The propensity for a claim to exceed its predicted total resolution cost, including medical costs, is referred to herein as "claim volatility."

Volatility in Workers' Compensation claims may manifest itself in several ways within the medical portion of the reserve. Medical conditions may worsen substantially. Treatments may result in unexpected complications. Injuries may carry low, but meaningful probabilities of secondary harm. For example, assume an employee suffers a back strain as a result of his employment. The typical conservative course of treatment would not require surgery or significant loss of time from work. In some cases, surgery and substantial loss of work occurs, and in a small portion of those cases, permanent and total disability may result with significant ongoing medical needs. In the low likelihood scenarios of additional surgery and permanent disability, the costs of the claim would be substantially higher.

Identification and triage of claims with high volatility potential would allow for improved alignment of resources towards higher risk claims, decrease the likelihood that injured parties suffer from low likelihood occurrences, and allow employers and insurers to reduce their exposure to the volatility those claims may present. Thus, there is a need in the art for methods and systems for identifying highly volatile claims. In addition, there is a need in the art for methods and systems of addressing these claims.

SUMMARY OF THE INVENTION

The invention relates generally to data analysis and to systems and methods for the computation of a likelihood that the costs incurred in relation to an insurance claim will demonstrate an increased degree of volatility in the future.

One aspect of the invention entails the use of a computer to carry out a predictive computation that estimates the likelihood that an insured loss with a given set of characteristics will exhibit volatility in the future, and thus warrant special attention. For example, a computer may employ a predictive model to estimate the likelihood that an insurance claim will be volatile. The determination of the likelihood that a claim will be volatile is preferably based upon parameters, including, for example and without limitation, the age of the insured, nature of the insurance benefit, policy limitations, medical diagnoses, pharmacy costs, the need for psychiatric treatment, expected time to return to work, an employee's capacity after returning to work, whether there is a need for physical therapy or surgery, and the particular type of damage, disability or injury. This data may be stored in a data warehouse and accessed by the computer assigned to carry out the predictive computation. The predictive computation may be based on a linear regression model, a neural network, a decision tree model, a collection of decision tree models, other statistical methods, or combinations thereof. The predictive computation may be executed at any point during the processing of a claim, however, in one embodiment, the computation is carried out after a period of time (e.g. 30, 60 or 90 days) after receiving the notice of a particular loss.

The predictive computation may be applied to new claims. It may also be applied to re-evaluate open claims on an insurance company's backlog. It may also be applied at multiple stages during the life of the processing of a claim as more data becomes available. Periodic recomputation may identify volatile claims that were not initially identified as such based upon the data available at earlier points in time. Recomputation may also be warranted where the circumstances of a claim change unexpectedly. Periodic recomputation may also result in the re-classification of a previously volatile claim as stable based on new and changed data.

According to another aspect, the invention relates to a method of administering insurance claims based on the results of the predictive computation to more efficiently process claims. The insurance company may, for example, adjust the level of oversight with respect to the processing of claims in order to obtain the best outcome. Processing the claim may also include managing the claim and assigning resources to the claim to have an increased impact on a claimant's outcome. For example, based on each claim's predicted likelihood of being a volatile claim, the insurer can assign claims to claims handlers with a skill set and level of experience commensurate with the claim, provide an appropriate level of medical review and treatment, and/or provide an appropriate level of vocational counseling. Medical review and treatment may include, without limitation, review and/or treatment from physical therapists, occupational therapists, vocational rehabilitation providers, physicians, nurses, nurse case managers, psychologists, alternative medical practitioners, chiropractors, research specialists, drug addiction treatment specialists, independent medical examiners, and social workers. The selection of the level of review and/or treatment may include a selection of a particular provider having the skills, experience, and domain knowledge applicable to the claim, an aggressiveness of treatment or review, and/or frequency of treatment or review. In one embodiment, the method includes recommending a specific course of treatment based on a detected change in the volatility of a claim. Recommended treatments are based on the specific condition and medical history of the injured party as well as, at least in part, historical treatment statistics, expert advice, and/or on appropriate clinical trials. Such recommendations may be provided, for example, to claims adjusters and/or to medical or case management personnel to review and consider based on the specific condition and injured party involved in the claim.

In addition, the insurance company may employ the results of the predictive computation to determine if the level of non-compensatory expenses are deemed appropriate for a given claim. The insurance company may also use the results to determine a level of non-medical investigation or analysis to apply to the claim. For example, the results may be used to determine if a private investigator or other vendor or expert should be engaged to further investigate the circumstances surrounding a claim. Such investigation might be used to detect fraud, inform subrogation determinations, and recommend treatments. The results also may be used to assign additional resources, including but not limited to actuaries, statisticians, or other research analysts to review the claim.

The insurance company, in various embodiments, may also make information pertaining to the volatility likelihoods of groups of claims available for the use of employees who are responsible for setting the insurance company's reserves. Any of the uses described above may be applied to all claims or limited to claims that meet a specified likelihood level (e.g. a 90% likelihood of a claim being volatile, or a 75% likelihood of a claim being volatile).

BRIEF DESCRIPTION OF THE FIGURES

The foregoing discussion will be understood more readily from the following detailed description of the invention with reference to the following figures.

DESCRIPTIONS OF CERTAIN ILLUSTRATIVE EMBODIMENTS

To provide an overall understanding of the invention, certain illustrative embodiments will now be described, however, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
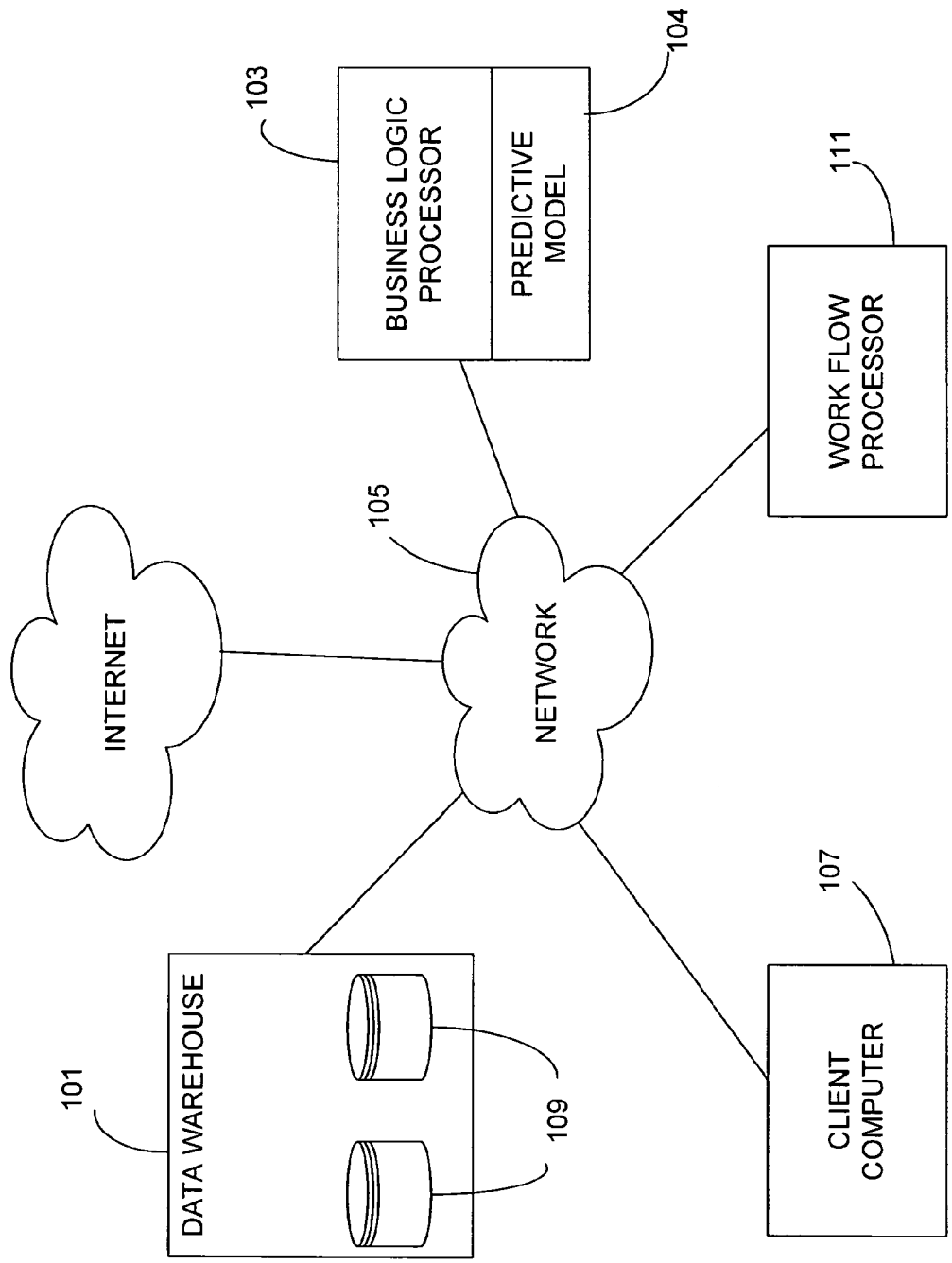
FIG. 1 is a diagram illustrating a system for claim administration based upon a claim's predicted likelihood volatility, according to one embodiment of the invention.

FIG. 1 is a diagram illustrating a system for claim administration based upon a claim's predicted volatility, according to one embodiment of the invention. The system contains a data warehouse 101, a business logic processor 103, a predictive model 104, a network 105, a client terminal 107, and a workflow processor 111.

The data warehouse 101 is the main electronic depository of an insurance company's current and historical data. The data warehouse 101 includes one or more interrelated databases 109 that store information relevant to insurance data analysis. The interrelated databases 109 store both structured and unstructured data. Structured data includes data stored in defined data fields, for example, in a data table. Unstructured data includes raw information, including, for example, computer readable text documents, document images, audio files, video files, and other forms of raw data.

Databases in the interrelated databases 109 may for example store data in a relational database, in various data fields keyed to various identifiers, such as, without limitation, customer, data source, geography, or business identifier (such as Standard Industry Classification code). The information stored in the data warehouse 101 is obtained through communications with customers, agents, sensors monitoring insured property, vendors, data and text mining software applications, and third party data providers and investigators. In other implementations, use of the data warehouse can be replaced with a more traditional database application without departing from the scope of the invention.

The business logic processor 103 includes one or more computer processors, a memory storing the predictive model 104, and other hardware and software for executing the predictive model 104. More specifically, the software may be computer readable instructions, stored on a computer readable media, such as a magnetic, optical, magneto-optical, holographic, integrated circuit, or other form of non-volatile memory. The instructions may be coded, for example, using C, C++, JAVA, SAS or other programming or scripting language. To be executed, the respective computer readable instructions are loaded into Random Access Memory associated with the business logic processor 103.

The predictive model 104 is used by the business logic processor 103 to estimate the likelihood that a claim will exhibit increased volatility in comparison to other claims. Volatility may be measured in various ways. In one implementation, the volatility estimated is the volatility of medical payments incurred in relation to a claim. A claim is considered to be volatile if it has the potential to result in significant non-linear increases in medical expenditures. In other implementations, volatility may be measured in other ways. For example, in various alternative embodiments, instead of focusing only on medical costs, volatility can viewed as the potential for significant non-linear increases in other individual cost components, or combinations thereof, associated with a claim, including but not limited to medical review and management, third party investigation expenses, and claim oversight costs. In alternative embodiments, the business logic processor may evaluate the likelihood that costs associated with a claim will be stable, rather than volatile.

The predictive model 104 may be a linear regression model, a neural network, a decision tree model, or a collection of decision trees, for example, and combinations thereof. The predictive model 104 may be stored in the memory of the business logic processor 103, or may be stored in the memory of another computer connected to the network 105 and accessed by the business logic processor 103 via the network 105.

The predictive model 104 preferably takes into account a large number of parameters, such as, for example, some or all of the parameters listed in Table 1, below. The evaluation period referred to in the table may be, for example, and without limitation, the first 45, 90, or 120 days after a first notice of loss is received by the insurance company. Alternatively, the evaluation periods may be regular periods, for example, months, quarters, or years.

TABLE 1

Illustrative Variables for Predictive Models

Medical invoice totals for the following (during evaluation periods)

Pharmacy
Doctors office
Inpatient Hospital
Outpatient Hospital
Emergency Room
Ambulatory Surgical Center
Nursing Facility
Ambulance
Inpatient Psychiatric Facility
Community Mental Health Center
Count of visits of the following type (during evaluation periods)

Emergency
Critical care
Diagnostic
Physical therapy
Surgery
Anesthesia
Radiology
Whether Primary injury is one of the following types Nervous
Back sprain
Fracture
Dislocation
Open wounds
Musculoskeletal
Compensation coverage code (varies by state)
Network penetration (In network verses out of network medical spend)
Estimated incurred (reserved amount) at end of evaluation period
Estimated total medical spend
Accident state
Claimant age
Nature of benefit code
Business unit and business group
Estimated indemnity payment
Prior claimant injuries and/or medical conditions Preferably, the predictive model 104 is trained on a collection of data known about prior insurance claims and their ultimate disposition, including, for example, and without limitation, the types of costs described above. In various embodiments, the particular data parameters selected for analysis in the training process are determined by using regression analysis or other statistical techniques, such as posterior probability modeling, known in the art for identifying relevant variables in multivariable systems. The results of such analysis can also be used to inform claims adjusters as to the importance of various types of data to encourage inclusion of more data related to the more relevant parameters in free text fields or structured data fields of claims reporting forms. One particular predictive model suitable for use as the predictive model 104, and methods for generating such a predictive model are described further in relation to FIGS. 2-7.

Figure 2:
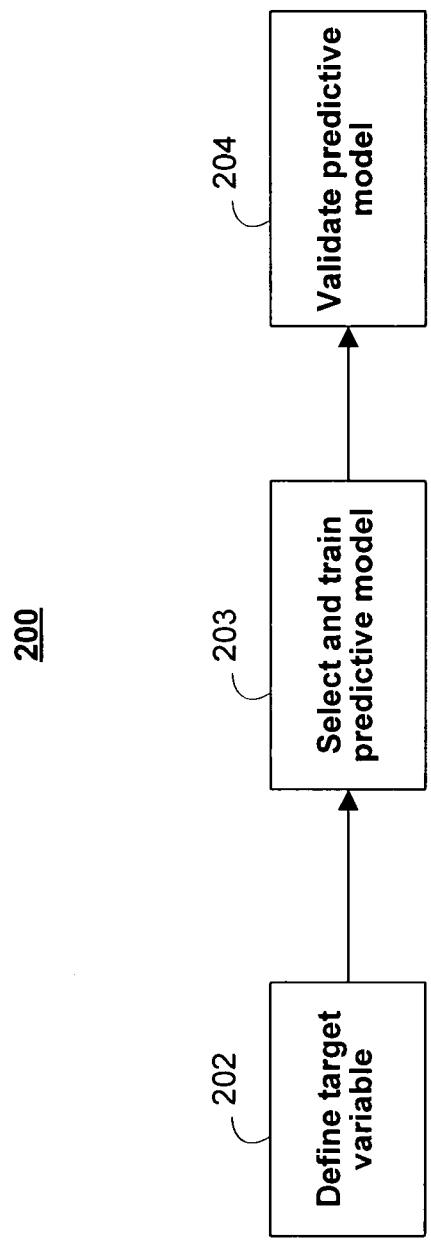
FIG. 2 is a flow chart of a method for generating a computerized model for predicting claim volatility according to an illustrative embodiment of the invention.

FIG. 2 is a flowchart of a method of generating and validating a predictive model for predicting claim volatility according to an illustrative embodiment of the invention. In step 202, a quantitative "target variable" is determined that may be used to categorize a collection of observed claim data into those that exhibit volatile behavior and those that do not. For example, a target variable may be the result of a function, which can then be compared against a threshold value. Claims that have a target variable value that exceeds the threshold value may be considered stable or volatile, depending on how function and threshold are defined. An illustrative process for determining a volatility target variable is described in relation to FIG. 4. The actual predictive model is created in step 203 from a collection of observed past claim data and the target variable. In a preferred embodiment, the predictive model has the form of one or more decision trees. The decision tree(s) may be used to predict the volatility of future claim data. An illustrative process for creating the decision tree(s) is described in relation to FIG. 5. An illustrative method for using the decision tree(s) to generate a volatility likelihood prediction is described in relation to FIG. 6. Finally, the predictive model is validated in step 204. Illustrative results of the validation of an exemplary model generation process are shown in FIG. 7.

In the context of worker's compensation insurance, volatility is a measure that captures unexpected increases in claim transactions. Claim transactions may be, for example, monthly medical expenditures associated with a claim. Medical expenditures often constitute the component of claim costs that is most likely to exhibit volatility in a worker's compensation claim. Although the model generation process is described below based on monthly medical expenditure data, it is understood that other types of claim transactional data may also be used. Volatile behavior includes, but is not limited to, non-linear growth, including, for example, sudden spikes, exponential, growth, and/or stepwise increases, in the monthly medical expenditures associated with a claim.

Figure 3:
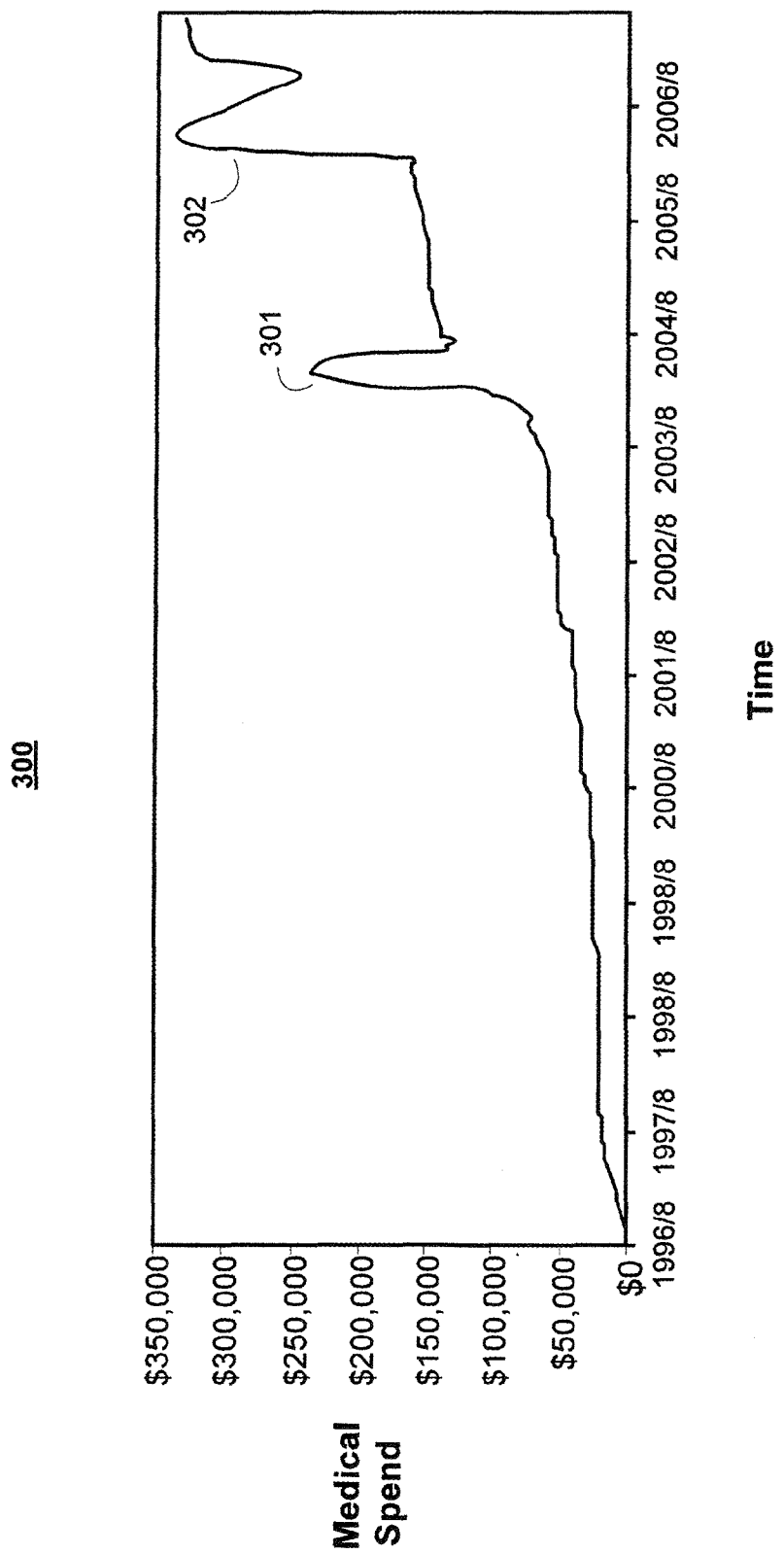
FIG. 3 is a plot of medical expenditures associated with a volatile claim, according to an illustrative embodiment of the invention.

FIG. 3 shows a graph 300 of the monthly medical expenditure of an illustrative claim that exhibits volatile behavior. Graph 300 shows the amount of medical expenditure per month of the claim over a ten year period. Spikes 301 and 302 indicate unexpected increases in monthly medical expenditure. These increases in spending may, for example, correspond to a costly surgical procedure, unexpected complications arising from routine treatment, for example, infection, or another medical cost that may be out of the norm. The overall exponentially increasing trend exhibited by graph 300 may, for example, reflect an injured party's progressively worsening medical condition.

Figure 4:
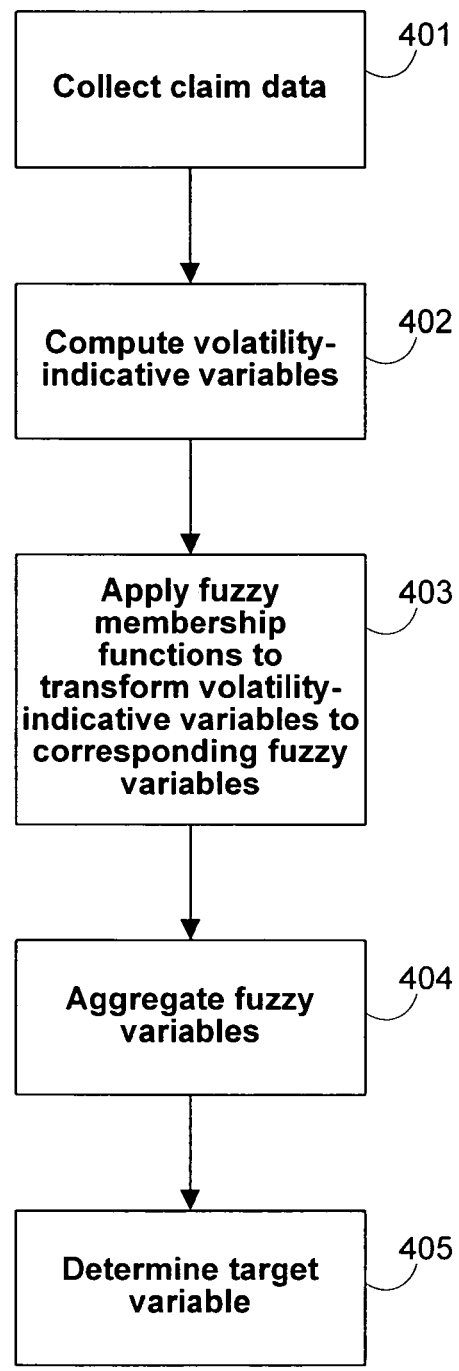
FIG. 4 is a flow chart of a method for deriving a target variable for classifying prior claims with respect to their volatility, according to an illustrative embodiment of their invention.

FIG. 4, is a flowchart of a method of determining the target variable for volatility, as mentioned above in connection to step 202 of FIG. 2. As mentioned above, the target variable is a quantitative function describing a level of volatility. In one embodiment of the invention, it may be used to categorize the past behavior of a claim as volatile or nonvolatile in a binary fashion. In other embodiments, it may assign to the past behavior of a claim a degree of volatility that is more finely defined, such as high, medium, or low volatility. In such embodiments, the target variable value may be compared against multiple thresholds to properly classify an associated claim.

Defining the target variable begins, at step 401, by collecting monthly medical expenditure data for each of a group of claims. In one embodiment, the monthly medical expenditure data for each claim may include expenditure data for a time period ranging from one month to 15 years or more. The claims may be currently pending claims and/or historical claims that have finally resolved and been closed. The monthly medical expenditure of each claim may take the form of a time series, such as the time series plotted in graph 300 of FIG. 3.

At step 402, the expenditure data for each claim or for groups of claims is analyzed to produce values for volatility-indicative variables, i.e., statistical characteristics deemed to be evidence of volatility. Illustrative volatility-indicative variables include, in one implementation, the mean ($\mu$) monthly medical expenditure for a claim, the semi-quartile range (SQ) of monthly medical expenditures for the claim, and correlation coefficient ($\rho$) of the monthly medical expenditure of each claim over a particular time interval (indicating the degree to which medical expenditures in a given month correlate to the expenditures in one or more preceding months). At step 403, fuzzy membership functions may be applied to the relationship between each of the statistical parameters and "the degree of volatility" as seen in the historic data. Fuzzy membership functions are a subset of fuzzy logic operations. Such functions are described in Fuzzy Sets, by Zadeh, L. A., Vol. 8, 1965, 338-353, which is incorporated herein by reference. For example, the mean, semi-quartile range, and correlation coefficient of the monthly medical expenditure of a claim may be used to form fuzzy variables $\mu_{fuzzy}$, $SQ_{fuzzy}$, and $\rho_{fuzzy}$. At step 404, the fuzzy variables are aggregated to determine a single variable that is representative of degree of volatility. One examples of a suitable aggregation function is the minimum of the individual fuzzy variable values. At step 405, the target variable value is decided based on threshold values for the aggregated fuzzy variable. For example, in one implementation, claims with an aggregate fuzzy score of more than 0.135 are considered volatile and the remaining claims are considered non volatile. The target variable for a claim was assigned a value of 1 for volatile claims and 0 for non-volatile claims.

The specific target variable (including fuzzy membership functions, an aggregation operation, and a corresponding threshold) used in generating the predictive model in step 203 is chosen by applying multiple target variables to several training data sets. The target variable is selecting according to the minimax criterion. That is, the selected target variable is that which minimizes the maximum error in application of the target variable to the training data sets. Each set of training data consists of medical expenditure data for multiple claims. The claims in the training data sets are manually prescreened for volatility by a human expert. An error occurs when the volatility category of the claim as determined by the target variable is different from that determined by the human expert. In some implementations, the human expert identifies each claim as either volatile or stable. In such implementations, all misidentifications made by the applying a potential target are weighted equally. In other implementations, the human expert also assigns each claim a degree of volatility. In such implementations, the magnitude of an error associated with a misidentification is based on the degree of volatility assigned to the claim by the human expert. For example, misidentifying a highly volatile claim as stable would yield a larger error than the misidentification of a slightly volatile claim. Once the fuzzy membership functions and aggregation operations have been determined, a sample of claim trends with known volatility may be used to validate the effectiveness of the target variable.

The process described by flowchart 400 retrospectively describes the volatility of a set of observed past claims. In contrast, flowchart 500 of FIG. 5 details the process of creating a predictive model that may be used to predict future volatility in a claim. In one embodiment of the invention, the predictive model generated according to the method depicted in FIG. 5 includes a collection of decision trees. The parameters used in the decision tree models may include some or all of the parameters listed in table 1, above.

According to the flowchart 500, the process of building a predictive model begins with collecting a set of training data, at step 501. The training data set consists of data for previously handled claims. At step 502, the volatility of each claim in this data set may be determined by computing the claim's target variable as described in relation to FIG. 4. The claims in the training data set are categorized into a volatile and non-volatile group. Preferably, a large number of claims, for example, more than 10,000 or more than 100,000 are included in the training data set.

At step 503, a number, N, of stratified samples is generated from the training data set. The samples are stratified in that each sample has the same proportion of volatile to nonvolatile claims. In one embodiment, the volatile group of claims may be oversampled to create samples in which the percentage of claims that are volatile in each sample exceeds the percentage of volatile claims in the full training data set. For example, experimental data suggests that on the order of 1% of claims demonstrate high levels of volatility. However, to adequately train the collection of decision trees referred to above, it may be beneficial to ensure 10% of the claims in each sample are volatile. Thus, each volatile claim may be included in multiple samples.

For each of the N samples generated in step 503, a decision tree is generated. In one implementation, each leaf node in each decision tree has an associated likelihood value, for example, a posterior probability, that a claim will exhibit volatility in the future. The output of processing a claim with the decision tree is the likelihood value associated with the leaf node into which the claim is categorized. The N decision trees may be generated independently from each other and may be formed using one or more algorithms known in the art. There are a number of such methods for generating decision trees from a set of training data, including Gini index and entropy reduction based methods. These methods are described in, for example, Barry De Ville (2006), Decision Trees for Business Intelligence and Data Mining: Using SAS Enterprise Miner, SAS Press Series. Each of the N decision trees may be generated using a different or the same method. The particular tree generation method used for each sample may be selected or optimized based on subsequent model validation results. For example, each of the trees may be generated according to two or more models. Then, various combinations of the trees may be compared to see which yields the best results upon validation. The purpose of generating multiple trees from multiple data samples is to combat the tendency of decision tree models to change substantially in response to small changes in the training data. The predictive model also includes an aggregation function that can be applied to the outputs of the decision trees in the model to yield a final volatility likelihood score. In various implementations, the aggregation function serves to aggregate posterior probabilities expressed by individual decision trees. For example, suitable aggregation functions include, for example, voting methods that are proportion-based or average-based. In one particular implementation, the aggregation function is a simple averaging of posterior probabilities from the N decision trees.

Figure 5:
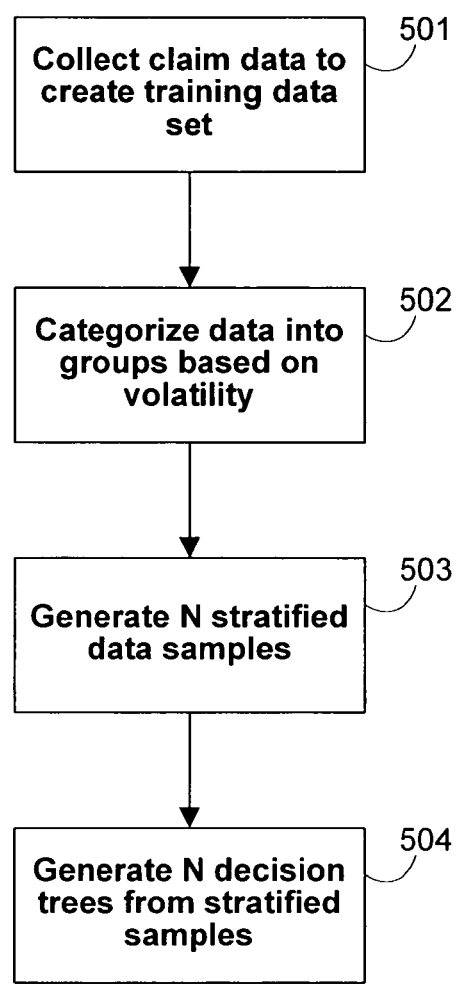
FIG. 5 is a flow chart of a method of training a volatility predictive model, according to an illustrative embodiment of their invention.
Figure 6:
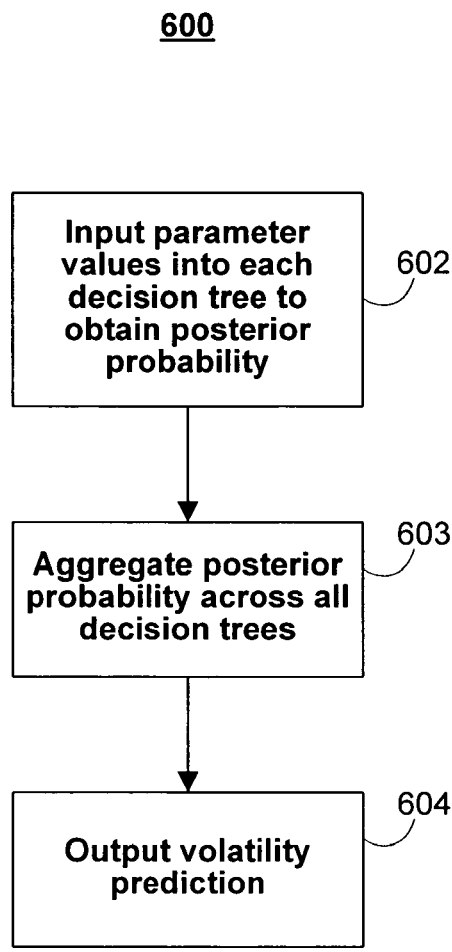
FIG. 6 is a flow chart of a method of applying a trained volatility predictive model, according to an illustrative embodiment of their invention.
Figure 7:
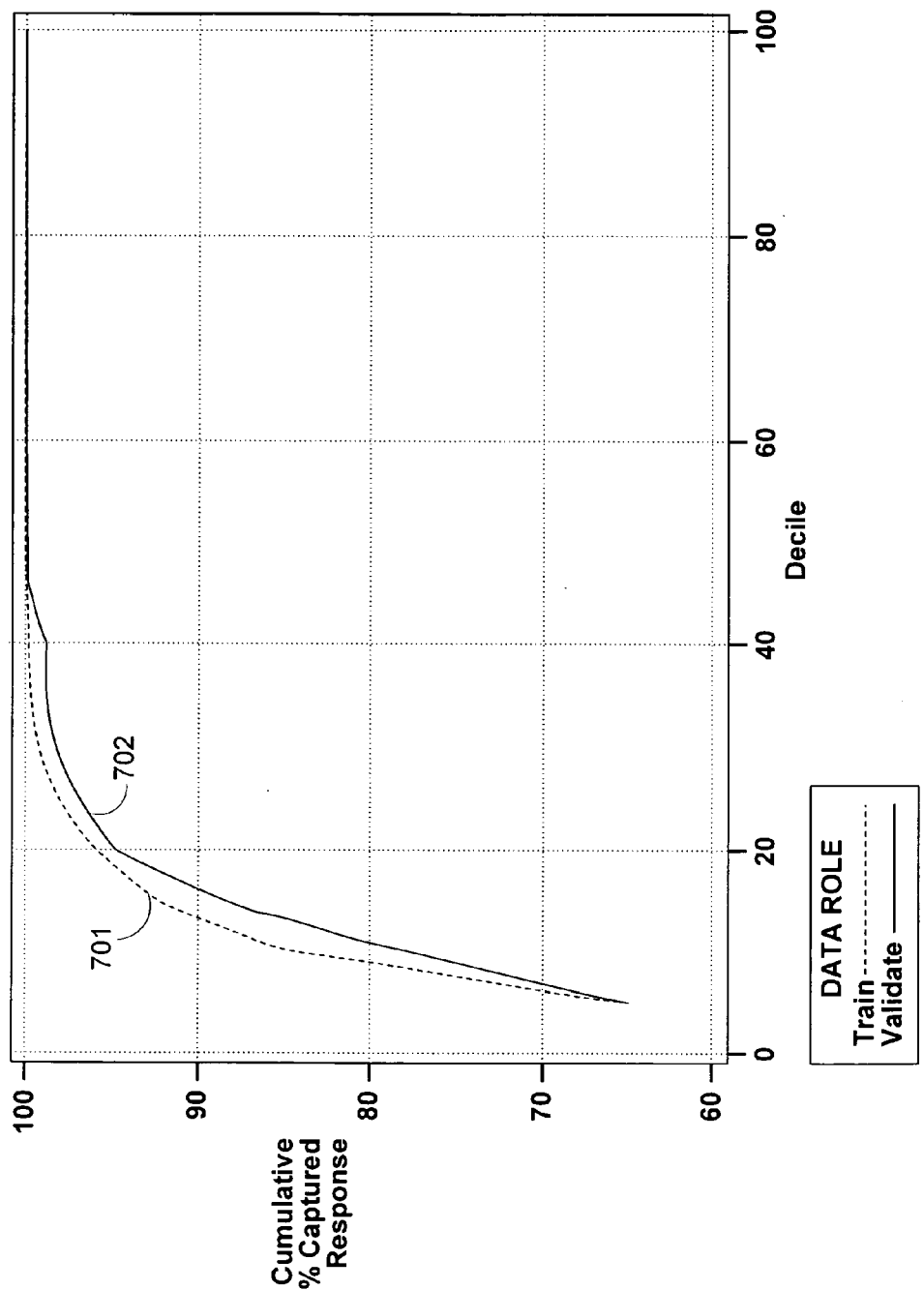
FIG. 7 is a plot of performance data derived from validating a volatility predictive model generated and trained according to an illustrative embodiment of their invention.

FIG. 6 is a flowchart of a method of using the predictive model generated in FIG. 5 to obtain a future volatility prediction on a particular test claim. At step 602, values for the decision tree parameters for the test claim are input into the decision trees. The decision trees are processed to produce likelihoods that the test claim will be volatile (as defined by the target variable). At step 603, the likelihoods from the decision trees are aggregated to produce an overall likelihood score, as described above. At step 604, the aggregated likelihood score is output by the predictive model for further processing.

In one example, a predictive model was generated and validated in accordance with the methodology described above. The model was generated using a sample data set including several hundred thousand historical claims. Approximately 1% of these claims were identified as being volatile based on the classification methodology described above in relation to FIG. 4.

Ten stratified samples were obtained from the training data set using a bootstrap sampling methodology with replacement. The group of volatile claims was oversampled so that the ratio of volatile to nonvolatile claims in each stratified sample was one to ten. Ten decision trees were generated using these ten stratified samples. Seventy percent of the claims in each sample set were used to train a respective predictive model. The remaining thirty percent of the claims were used to validate that model. To generate each tree, one tree was selected from multiple candidate trees generated using various combinations of parameters and decision tree methodologies. In this specific example, six of the trees were selected to be Gini index based trees and the remaining trees were entropy reduction based trees. The volatility likelihood values produced by the trees were aggregated together by computing their mean.

Next, an eleventh sample of about ten percent of the total sample claims, also selected using replacement, was obtained. 70% of these claims were used to train the aggregate model. The remaining 30% were used to conduct a final validation of the model. The validation results are depicted in FIG. 7. In FIG. 7, curve 701 shows the cumulative percent captured response when the model is used to predict the likelihood of future volatility using the training claims in the eleventh sample data set. Curve 702 results from using the model to predict future volatility of the validation data set. Since the validation data set is independent of the data used to generate the model, curve 702 is a representation of the actual effectiveness of the model. As seen in both curves 701 and 702 on FIG. 7, about 75% of the known volatile claims processed by the model received outputs in the top deciles of claim outputs.

The model generation and application processes described above are merely illustrative methods for generating and applying a model for use in the process described herein. Other model generation and respective application processes as well as other types of models may be employed without departing from the scope of the invention. For example, in alternative implementations, the predictive model 104 can be based on expert systems or other systems known in the art for addressing problems with large numbers of variables. The model may be generated by the business logic processor 103, another computing device operated by the insurance company, or by a computing device operated by a third party having access to the insurance company's prior claims data.

The predictive model 104 may be updated from time to time as an insurance company receives additional claim data to use as a baseline for building the predictive model 104. The updating includes retraining the model based on the updated data using the previously selected parameters. Alternatively, or in addition, updating includes carrying out the model generation process again based on the new data.

Referring back to FIG. 1, the network 105 enables the transfer of claim data between the data warehouse 101, the business logic processor 103, the client computer 107, the business workflow processor 111, and third party suppliers or vendors of data. The network includes a local area network as well as a connection to the Internet.

The client terminal 107 includes a computer that has a CPU, display, memory and input devices such as a keyboard and mouse. The client terminal 107 also includes a display and/or a printer for outputting the results of the analysis carried out by the predictive model 104. The client terminal 107 also includes an input module where a new claim may be filed, and where information pertaining to the claim may be entered, such as a notice of loss, for example. In addition to being implemented on the client terminal 107, or in the alternative, the input module may be implemented on other insurance company computing resources on the network 105. For example, the input module may be implemented on a server on the network 105 for receiving claims over the Internet from one or more websites or client applications accessed by insurance company customers, company agents, or third party preprocessors or administrators. The input module is preferably implemented as computer readable and executable instructions stored on a computer readable media for execution by a general or special purpose processor. The input module may also include associated hardware and/or software components to carry out its function. For example, for implementations of the input module in which claims are entered manually based on the notice of loss being received telephonically, the input module preferably includes a voice recording system for recording, transcribing, and extracting structural data from such notices.

The workflow processor 111 includes one or more computer processors and memory storing data pertaining to claim handlers, supervisors, medical reviewers, medical providers, medical provider supervisors, private investigators, and other vendors. Stored information may include, without limitation, experience, skill level, reputation, domain knowledge, and availability. The workflow processor 111 also includes other hardware and software used to assign a claim to at least one of a claim handler, supervisor, medical reviewer, medical provider, medical provider supervisor, legal services provider, and independent investigator by the business logic processor 103. For example, in one implementation, the workflow processor 111 assigns more aggressive medical care and review to claims having higher likelihoods of being volatile claims, thereby applying resources to those that might benefit the most. The level of medical care and/or review management may be tiered. Medical care and review may include, without limitation, review and/or treatment from physical therapists, occupational therapists, vocational rehabilitation providers, physicians, nurses, nurse case managers, psychologists, alternative medical practitioners, chiropractors, research specialists, drug addiction treatment specialists, independent medical examiners, and social workers. The selection of the level of review and/or care may include a selection of a particular provider having the skills, experience, and domain knowledge applicable to the claim, an aggressiveness of treatment or review, and/or frequency of treatment or review. The workflow processor 111 or the business logic processor 103 may also have software configured to determine a general expense tolerance for a claim, i.e., a tolerance for expending resources on costs not associated with compensating a claimant or covered individual.

As an alternative to the illustrated FIG. 1, the physical components of the data warehouse 101, client computer 107, business logic processor 103, predictive model 104 and workflow processor 111 may be housed within the same computing device. As another alternative, the functionality of the business logic processor 103 and workflow processor 111 may be implemented on a single computing device.

Figure 8:
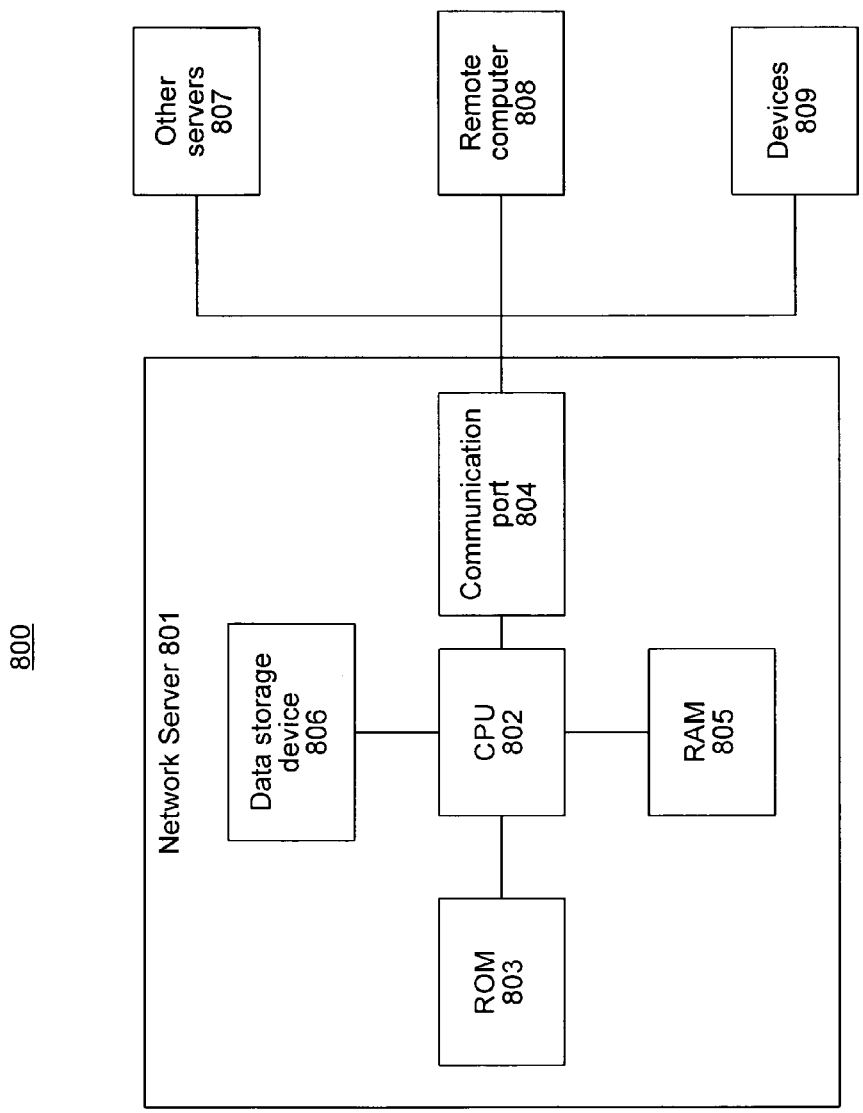
FIG. 8 is a block diagram of a computing architecture suitable for implementing various ones of the computing devices depicted in FIG. 1.

FIG. 8 is a block diagram of a computing architecture suitable for implementing various ones of the computing devices depicted in FIG. 1, including, for example, the business logic processor 103, the client computer 107, and the workflow processor 111.

Computer 801 comprises at least one central processing unit (CPU) 802, at least one read-only memory (ROM) 803, at least one communication port or hub 804, at least one random access memory (RAM) 805, and one or more databases or data storage devices 806. All of these later elements are in communication with the CPU 802 to facilitate the operation of the computer 801. The computer 801 may be configured in many different ways. For example, computer 801 may be a conventional standalone computer or alternatively, the function of computer 801 may be distributed across multiple computing systems and architectures.

Computer 801 may be configured in a distributed architecture, wherein databases and processors are housed in separate units or locations. Some such units perform primary processing functions and contain at a minimum, a general controller or a processor 802, a ROM 803, and a RAM 805. In such an embodiment, each of these units is attached to a communications hub or port 804 that serves as a primary communication link with other servers 807, client or user computers 808 and other related devices 809. The communications hub or port 804 may have minimal processing capability itself, serving primarily as a communications router. A variety of communications protocols may be part of the system, including but not limited to: Ethernet, SAP, SAS™, ATP, BLUETOOTH™, GSM and TCP/IP.

The CPU 802 comprises a processor, such as one or more conventional microprocessors and one or more supplementary co-processors such as math co-processors. The CPU 802 is in communication with the communication port 804 through which the CPU 802 communicates with other devices such as other servers 807, user terminals 808, or devices 809. The communication port 804 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 802 is also in communication with the data storage device 806. The data storage device 806 may comprise an appropriate combination of magnetic, optical and/or semiconductor memory, and may include, for example, RAM, ROM, flash drive, an optical disc such as a compact disc and/or a hard disk or drive. The CPU 802 and the data storage device 806 each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wired medium or combination of the foregoing. For example, the CPU 802 may be connected to the data storage device 806 via the communication port 804.

The data storage device 806 may store, for example, (i) a program (e.g., computer program code and/or a computer program product) adapted to direct the CPU 802 in accordance with the present invention, and particularly in accordance with the processes described in detail hereinafter with regard to the CPU 802; (ii) databases adapted to store information that may be utilized to store information required by the program. Suitable databases include data warehouse 101 of FIG. 1.

The program may be stored, for example, in a compressed, an uncompiled and/or an encrypted format, and may include computer program code. The instructions of the program may be read into a main memory of the processor from a computer-readable medium other than the data storage device 806, such as from a ROM 803 or from a RAM 805. While execution of sequences of instructions in the program causes the processor 802 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as determining a volatility score and adjusting a workflow based on a determined volatility score. The program also may include program elements such as an operating system, a database management system and "device drivers" that allow the processor to interface with computer peripheral devices 809 (e.g., a video display, a keyboard, a computer mouse, etc.).

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 802 (or any other processor of a device described herein) for execution. For example, the instructions may initially be borne on a magnetic disk of a remote computer 808. The remote computer 808 can load the instructions into its dynamic memory and send the instructions over an Ethernet connection, cable line, or even telephone line using a modem. A communications device 804 local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

As previously discussed with reference to FIG. 1, servers may also interact and/or control one or more user devices 809, such as displays and printers, or remote computers 808 such as, e.g., agent terminals 108 and carrier terminals 122. The terminals may include any one or a combination of a personal computer, a laptop, a personal digital assistant, a mouse, a keyboard, a computer display, a touch screen, LCD, voice recognition software, or other generally represented by input/output devices required to implement the above functionality.

Figure 9:
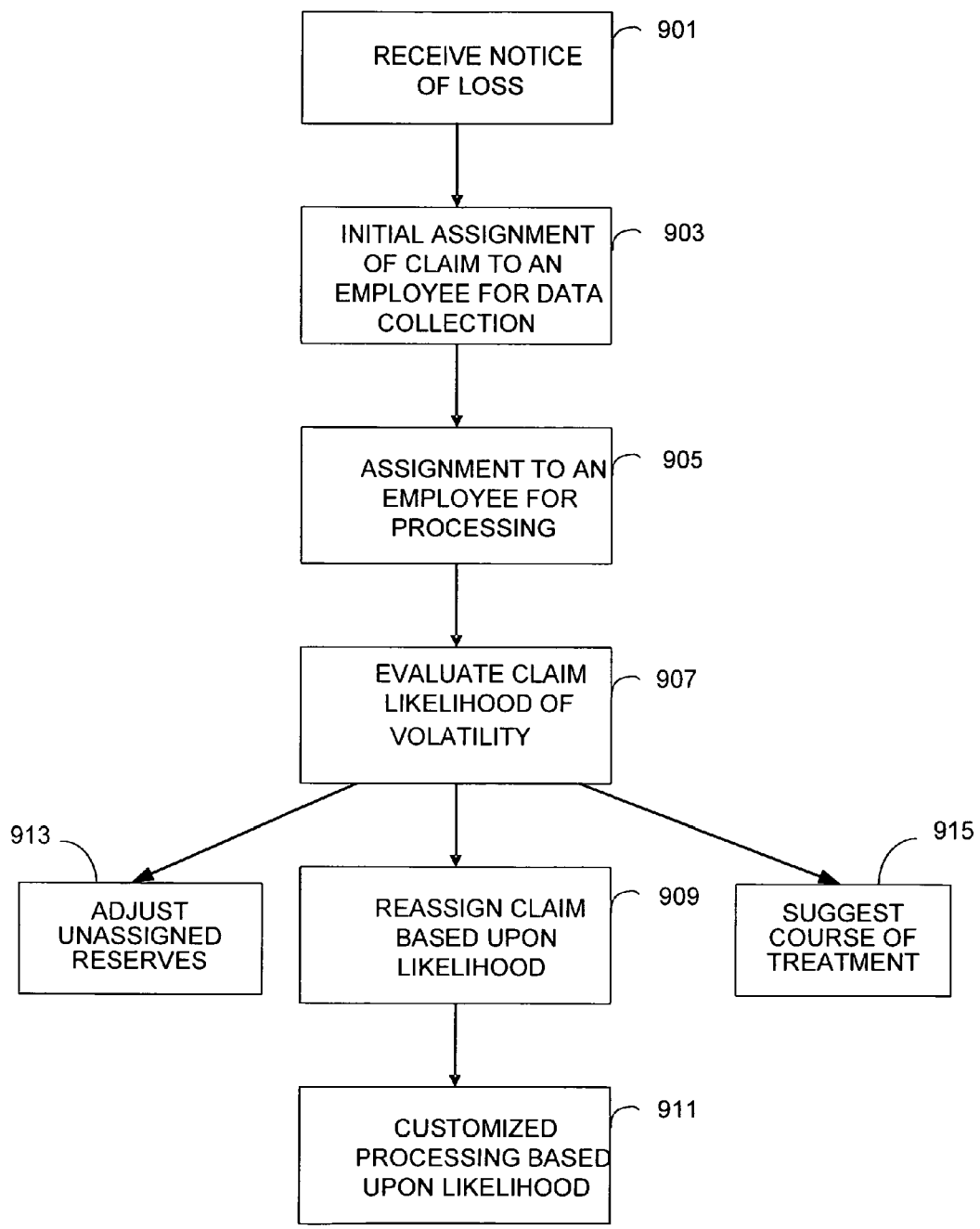
FIG. 9 is a flowchart of a method of claim administration based upon a claim's predicted likelihood of exhibiting volatility, according to one embodiment of the invention.

FIG. 9 is flowchart illustrating a method of claim administration based upon a claim's predicted likelihood of exhibiting cost volatility, according to one embodiment of the invention. The method begins at step 901, when an insurance company receives a notice of loss. The notice of loss may be received from a claimant, from a pre-processor, or from a 3rd party administrator, for example. The notice of loss may be received by telephone, mail, e-mail, web page, web server, or through other data communications over the Internet. In addition, a notice of loss may be received directly or indirectly from sensors monitoring an insured property via a wireless or wired network connection.

Next, at step 903, the claim is assigned to a first employee of the company, or agent associated therewith, for the collection of basic data relating to the claim. At step 905, the claim is assigned to a second employee for processing. This step may be manual. For example, the first employee may review the collected data and make a judgment as to which second employee has the most appropriate skill set and experience level for handling the claim. Alternatively, the assignment may be automatic. For example a computer may assign the claim to the second employee based upon a series of computations relating to pre-set criteria.

After a period of time in which additional claim characteristics are collected by the employee assigned to process the claim (e.g., 30, 45, 60, or 90 days after the notice of loss) the business logic processor 103 computes a predictive estimate of the likelihood that the claim will exhibit volatility. The business logic processor 103 outputs a value indicating the likelihood that the claim will be volatile. For example, the likelihood may take the form of a raw score, a probability value in the form of a probability, i.e., a numeric value between zero and one or between zero percent and one hundred percent, a tier or classification value (e.g. high likelihood, medium likelihood, or low likelihood or level 1, level 2, level 3, level 4, or level 5). The likelihood value may also be a relative value comparing the likelihood of the claim being volatile with the likelihood that other claims being processed will be volatile. This relative value may be an absolute ranking of the claim with respect to other pending claims, or it may be a value indicating a tranche of claims, for example, the top 5%, 10%, or 90% of claims, or top 5, top 10, or top 90 claims most likely to be volatile claims. The output likelihood value can then be used for customized processing of the claim. A data file or report may also be generated for each claim or for a group of claims, which may include data parameters associated with the characteristics of the claim or group of claims, as well as their likelihood of being volatile and the ranking with respect to other pending claims. This report may then be forwarded, for example, to the client terminal 107.

Next, at step 909, the workflow processor 111 reassigns the claim to an employee for managing based upon the likelihood value output by the business logic processor 103. Lastly, at step 911, the assigned employee processes the claim according to its likelihood of being volatile. For example, the level of oversight, level of medical care and review (as described above), non-compensatory expense tolerance, and level of factual investigation for the claim may be based in part on the volatility likelihood. Alternatively, the medical care and review (as described above), non-compensatory expense tolerance, and level of factual investigation for the claim may be set automatically by the workflow processor 111 based on the volatility likelihood.

In addition, or in the alternative to reassigning the claim at step 909, the business logic processor 103 or other computing device on the network 105, may utilize the likelihood value to adjust unassigned reserves (either IBNR or surplus reserves) maintained by the insurance company (step 913), as described further below in relation to FIG. 10.

As another additional or alternative step to step 909, the business logic processor 103 outputs a suggested course of treatment for the injured party (step 915). The suggested course of treatment is based, in one implementation, on an expert system that identifies appropriate treatments based on volatility likelihood or changes in volatility likelihood, as well as the specific condition, presentation, and medical history of the injured party. Recommended treatments are based on the specific condition and medical history of the injured party as well as, at least in part, historical treatment statistics, expert advice, and/or on appropriate clinical trials. Such recommendations may be provided, for example, to claims adjusters and/or to case management personnel to review and consider based on the specific condition and injured party involved in the claim.

Figure 10:
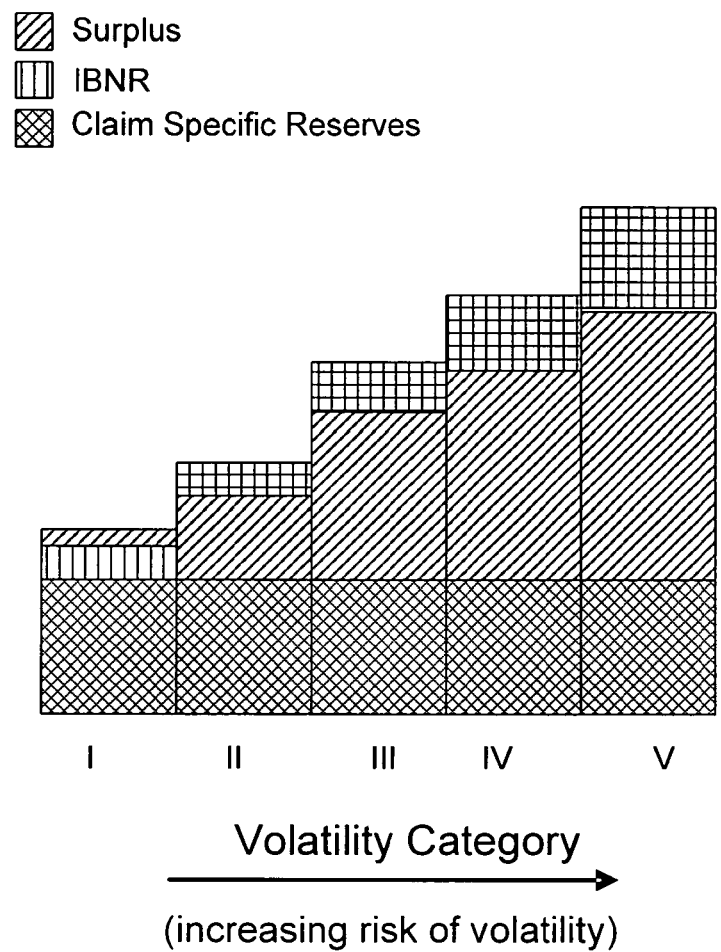
FIG. 10 is a diagram illustrating a volatility-based claims reserving strategy according to an illustrative embodiment of the invention.

FIG. 10 illustrates an exemplary optional reserving strategy which an insurance may elect to implement based on volatility information yielded by a computerized predictive model, according to one embodiment of the invention. As described above, insurance companies typically maintain three types of reserves, claim specific reserves, IBNR reserves, and surplus reserves. The latter reserves are not associated with any individual claim, but are instead associated with groups of claims. An IBNR (Incurred But Not Reported) reserve is an aggregate reserve that is not explicitly allocated to specific claims, but rather held as an umbrella over all claims to guard against low probability, high-loss occurrences. These reserves are maintained in case claims in a given group exceeds their expected costs. In the strategy depicted in FIG. 10, claims are divided into five groups, based on their relative likelihood of volatility in comparison to other claims being processed. For example, Group I includes the lowest two deciles of claims ranked based on their likelihood of volatility. Group II claims include claims in the next two deciles. Group III includes the claims ranked in the third and fourth deciles. Group IV includes claims with volatility likelihoods that are higher than 60% of other claims, but lower than a remaining 20% of claims. Group V includes the 20% of claims having the highest likelihoods of volatility. The depicted division of claims is merely illustrative in nature. Claims may be broken down in to fewer or more groups. In addition, in alternative implementations, certain groups include a larger range of claims and other include fewer claims. For example, in one implementation, each group has incrementally fewer claims than the preceding group. Group I includes the lowest 50% of claims ranked by volatility likelihood, and Group V includes the 5% of claims having the highest likelihood of volatility. In still other implementations, claims are grouped based on their absolute likelihood of volatility.

Each group has a corresponding IBNR and surplus reserve function, by which IBNR and surplus reserves are determined for the respective group. In one implementation, the reserve functions may be the product of the aggregate expected costs for the claims in a group with a reserving factor. The reserving factor increases in relation to the likely volatility of the claims in the group. For example, IBNR reserves for group I claims (those having the lowest likelihood of exhibiting volatility) may be set to 0.25 times the total expected costs of all claims in Group I. In contrast IBNR reserves for group V claims (those with the highest likelihood of exhibiting volatility) may be set to be 2.0 times the total expected costs of all claims in Group V.

In another embodiment of the invention, multiple, or all of a company's insurance claims are subject to the predictive computation. In this embodiment, the predictive computation is executed consistently at a pre-set interval, for example, once a week, to claims that have reached a pre-set age (e.g. 30, 45, 60, or 90 days after notice of loss) during the time interval. These selected claims may then be managed according to their volatility likelihood. Alternatively, claims may be ranked according to their volatility likelihood, with those claims that are most likely (e.g. top 5%, 10% or 25% of claims, or top 5, 10 or 25 claims, etc.) to be volatile being managed in part according to their volatility likelihood. In this alternative, the number of pending claims may be adjusted in relation to the number of employees that are available for claim processing. Volatility likelihood for claims may be occasionally or periodically reprocessed to determine if information obtained since a previous volatility likelihood estimation alters the likelihood that that the claim will be volatile. Such a change and/or the magnitude of such a change relative to a prior volatility score is then analyzed to determine whether the claim merits different management, including but not limited to a different course of medical treatment.

Figure 11:
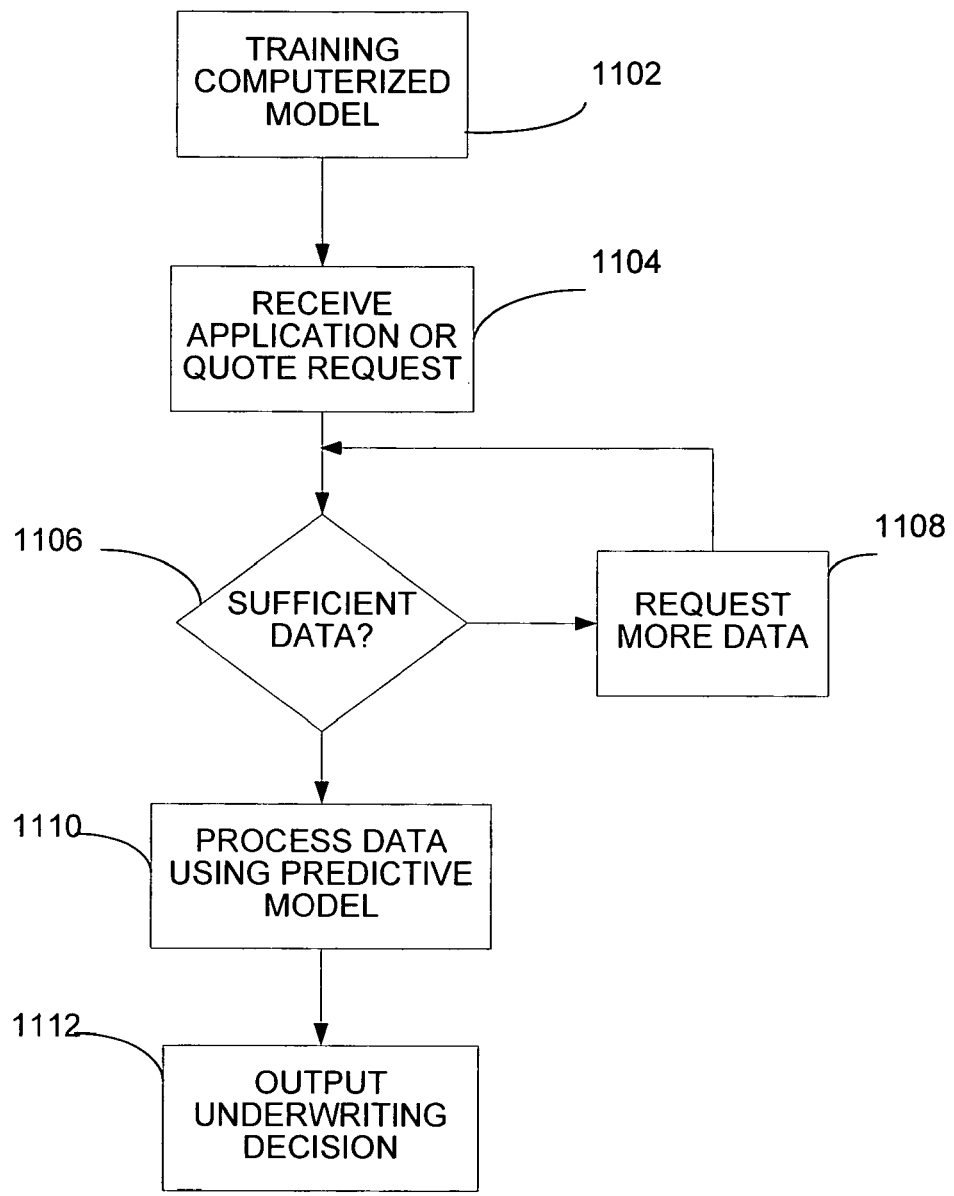
FIG. 11 is a flowchart of a method for underwriting insurance coverage based on a likelihood of a customer experiencing volatile claims.

FIG. 11 is a flow chart of a method 1100 for underwriting customers for insurance based on predicted claim volatility. Some businesses are more prone to experiencing losses that result in volatile claims than others. For example, injuries resulting from lifting heavy objects tend to more volatile than many other injuries. Thus, customers whose employees frequently lift heavy objects will be more prone to volatile claims than others. This volatility likelihood can be used to determine whether to extend coverage, renew such coverage, rate such coverage, and price such coverage. The volatility likelihood can also be used to adjust an underwriting workflow process. For example, an insurance company may require, and an insured might prefer, additional loss control, including investigations for customers likely to experience volatile claims.

The method 1100 includes training a computerized model configured for determining the likelihood that claims a customer or insured will incur will be volatile. The method begins with training a computerized predictive model (step 1102). In one implementation, the predictive model is of the type described above in FIGS. 2-5 and is trained on data solely related to an insurance customer, as opposed to, for example, details about specific claims or injured parties. In alternative embodiments, specific claim data is used for training the model in addition to customer specific data.

Next, an insurance company receives an application or quote request for insurance for a customer (step 1104). The application or quote includes data used to determine the likelihood that claims filed by the customer will be volatile. If the application or quote request includes insufficient data (decision block 1106), additional information is requested (step 1108).

Once sufficient data has been received, the data is processed by the predictive model (step 1110). In one implementation, the predictive model outputs a volatility indicator or score. Based on the score, an underwriting decision is output (step 1112). The underwriting decision may include a decision to extend a coverage, to deny a coverage, to recommend a different coverage, to renew a coverage, to rate a coverage, a coverage price decision, and/or an underwriting workflow decision.

The invention may be embodied in other specific forms without departing from the spirit or essential characteristics thereof. The forgoing embodiments are therefore to be considered in all respects illustrative, rather than limiting of the invention.

What is claimed is:

1. A system for processing insurance claim data comprising:
an input device for receiving data indicative of at least one parameter corresponding to a characteristic of an insurance claim;
a data storage device for storing the data indicative of the at least one parameter received by the input device;
a computerized model for determining a stability indicator for the insurance claim based on the data indicative of the at least one parameter, wherein the stability indicator is indicative of a likelihood of a non-linear increase in expenditures in relation to the insurance claim; and
one or more business logic processors configured to:
execute the computerized model; and
process the insurance claim based upon the stability indicator determined by the computerized model.

2. The system of claim 1, wherein the computerized model comprises one or more of a linear regression model, a decision tree model, or a collection of decision trees.

3. The system of claim 1, wherein the stability indicator is indicative of the likelihood of the non-linear increase in expenditures in one or more of medical payments, medical review and management, third party investigation expenses, and claim oversight.

4. The system of claim 1, wherein the non-linear increase in expenditures comprises one or more of spikes in expenditures, exponential growth of expenditures, and stepwise increases in expenditures.

5. The system of claim 1, wherein the one or more business logic processors are further configured to:
detect a change in the stability indicator associated with the claim, wherein a value of the stability indicator is inversely related to the likelihood of the non-linear increase in expenditures, and
recommend a course of treatment for a claimant of the claim based on the detected change.

6. The system of claim 1, wherein the one or more business logic processors being configured to process the insurance claim comprises the one or more business logic processors being configured to make a workflow determination for the insurance claim based upon the stability indicator, and
wherein the workflow determination comprises one of an assignment of the insurance claim to an employee from a plurality of employees to handle the claim based upon the stability indicator and a selection of an investigation level for the insurance claim based upon the stability indicator.

7. The system of claim 1, wherein:
the data storage device is configured such that the data indicative of the at least one parameter may be updated;
the at least one of the one or more business logic processors is configured to re-execute the computerized model in response to the data indicative of the at least one parameter being updated to determine a new instability indicator; and
the at least one of the one or more business logic processors is configured to process the insurance claim based upon the new instability indicator.

8. The system of claim 1, wherein:
the data storage device is configured such that the data indicative of the at least one parameter may be updated; and
at least one of the one or more business logic processors is configured to retrain the computerized model in response to the data indicative of the at least one parameter being updated.

9. A method for processing insurance claim data comprising:
receiving by an input device data indicative of at least one parameter corresponding to a characteristic of an insurance claim;
storing by a processor the data indicative of the at least one parameter in a data storage device;
executing by the processor a computerized model based at least in part on the data indicative of the at least one parameter to determine a stability indicator for the insurance claim, wherein the stability indicator is indicative of a likelihood of a non-linear increase in expenditures in relation to the insurance claim; and
processing by the processor the insurance claim based upon the stability indicator determined by the computerized model.

10. The method of claim 9, wherein the computerized model comprises one or more of a linear regression model, a decision tree model, or a collection of decision trees.

11. The method of claim 9, wherein the stability indicator is indicative of the likelihood of the non-linear increase in expenditures in one or more of medical payments, medical review and management, third party investigation expenses, and claim oversight.

12. The method of claim 9, wherein the non-linear increase in expenditures comprises one or more of spikes in expenditures, exponential growth of expenditures, and stepwise increases in expenditures.

13. The method of claim 9, further comprising:
detecting by the processor a change in the stability indicator associated with the claim, wherein a value of the stability indicator is inversely related to the likelihood of the non-linear increase in expenditures, and
recommending by the processor a course of treatment for a claimant of the claim based on the detected change.

14. The method of claim 9, wherein processing by the processor the insurance claim comprises the processor making a workflow determination for the insurance claim based upon the stability indicator, and
wherein the workflow determination comprises one of an assignment of the insurance claim to an employee from a plurality of employees to handle the claim based upon the stability indicator and a selection of an investigation level for the insurance claim based upon the stability indicator.

15. The method of claim 9, further comprising:
receiving by the input device an update to the data indicative of the at least one parameter;
re-executing by the processor the computerized model in response to the update to the data indicative of the at least one parameter to determine a new instability indicator; and
processing by the processor the insurance claim based upon the new instability indicator.

16. The method of claim 9, further comprising:
receiving by the input device an update to the data indicative of the at least one parameter; and
retraining by the processor the computerized model in response to the data indicative of the at least one parameter being updated.

17. A non-transitory computer-readable medium encoded with machine-readable instructions for processing insurance claim data, the machine-readable instructions being configured to cause a computer to:
receive data indicative of at least one parameter corresponding to a characteristic of an insurance claim;
store the data indicative of the at least one parameter in a data storage device;
execute a computerized model based at least in part on the data indicative of the at least one parameter to determine a stability indicator for the insurance claim, wherein the stability indicator is indicative of a likelihood of a non-linear increase in expenditures in relation to the insurance claim; and
process the insurance claim based upon the stability indicator determined by the computerized model.

18. The computer-readable medium of claim 17, wherein the machine-readable instructions are further configured to cause the computer to:
detect a change in the stability indicator associated with the claim, wherein a value of the stability indicator is inversely related to the likelihood of the non-linear increase in expenditures, and
recommend a course of treatment for a claimant of the claim based on the detected change.

19. The computer-readable medium of claim 17, wherein the instructions configured to cause the computer to process the insurance claim comprise instructions for configuring the computer to make a workflow determination for the insurance claim based upon the stability indicator,
wherein the workflow determination comprises one of an assignment of the insurance claim to an employee from a plurality of employees to handle the claim based upon the stability indicator and a selection of an investigation level for the insurance claim based upon the stability indicator.

20. The computer-readable medium of claim 17, wherein the machine-readable instructions are further configured to cause the computer to:
receive by the input device an update to the data indicative of the at least one parameter;
re-execute by the processor the computerized model in response to the update to the data indicative of the at least one parameter to determine a new instability indicator; and
process by the processor the insurance claim based upon the new instability indicator.

* * * * *